(12) United States Patent
Debolini

(10) Patent No.: US 8,347,524 B2
(45) Date of Patent: Jan. 8, 2013

(54) DRYER, IN PARTICULAR FOR POWDERED OR GRANULAR MATERIAL

(76) Inventor: Paolo Debolini, Turin (IT)

(*) Notice: Subject to any disclaimer, the term of this patent is extended or adjusted under 35 U.S.C. 154(b) by 902 days.

(21) Appl. No.: 12/469,984

(22) Filed: May 21, 2009

(65) Prior Publication Data

US 2009/0288309 A1 Nov. 26, 2009

(30) Foreign Application Priority Data

May 26, 2008 (EP) .................................... 08425377

(51) Int. Cl.
*F26B 25/06* (2006.01)
(52) U.S. Cl. ......................................................... 34/242
(58) Field of Classification Search ............... 34/242, 34/417; 277/637, 644, 645, 650, 652, 905, 277/910, 935, 944
See application file for complete search history.

(56) References Cited

U.S. PATENT DOCUMENTS

| | | | | |
|---|---|---|---|---|
| 4,103,906 A | * | 8/1978 | Gits | .............................. 277/391 |
| 2003/0116920 A1 | | 6/2003 | Friend et al. | |
| 2006/0207122 A1 | * | 9/2006 | Stewart et al. | .................. 34/242 |

FOREIGN PATENT DOCUMENTS

| EP | 1 396 696 A2 | 3/2004 |
|---|---|---|
| WO | WO 95/27181 A1 | 10/1995 |

OTHER PUBLICATIONS

European Search Report re application No. EP 08425377.2, dated Oct. 29, 2008.

* cited by examiner

*Primary Examiner* — Jiping Lu
(74) *Attorney, Agent, or Firm* — Husch Blackwell LLP

(57) ABSTRACT

The dryer comprises a casing having a longitudinal axis, a mixing shaft, a circular plate that seals an opening made in one of the end walls of the casing, and a frame supporting the casing and the shaft. In the edge portion of the opening closest to the chamber a first circumferential groove is made which is formed by a first radial cavity and by a second radial cavity deeper than the first, joined by an axial portion. An annular sealing element made of a non-stick material, having a cross-section comprising at least one axial strip and one radial strip, is inserted into the first groove in such a way that the radial strip is inserted into the second cavity and the axial strip occupies the axial portion and the mouth of the first radial cavity. A first sealing ring comprising at least one core of elastomeric material is inserted into the first cavity so as to radially compress the axial strip against the plate and a second sealing ring comprising at least one core of elastomeric material is inserted into the second cavity so as axially to compress the radial strip.

15 Claims, 6 Drawing Sheets

DRYER, IN PARTICULAR FOR POWDERED OR GRANULAR MATERIAL

The present invention relates to a dryer, in particular for powdered or granular material.

BACKGROUNDS OF THE INVENTION

More precisely, such a dryer comprises:
a casing formed by two opposing end walls and one side wall, so as to define within it a chamber for drying material having a longitudinal axis;
a shaft which is parallel and eccentric in relation to the said axis of the chamber and provided with operating means to cause it to rotate about its own longitudinal axis, the said shaft comprising a first portion outside the said chamber and a second portion arranged inside the said chamber for mixing the material to be dried;
a circular plate that seals an opening of a complementary shape made inside one of the end walls of the casing, the said plate having a hole for the sealed passage of the said shaft and being provided with operating means to cause its rotation about the axis of the chamber also involving the said shaft in this rotational movement, and
a frame supporting the casing and the shaft.

A known dryer of this type is described in international patent application WO-A-95/27181.

BRIEF SUMMARY OF THE INVENTION

The object of the present invention is to provide a better dryer than those described in the known art, in particular as regards preventing possible contaminations between different materials that are subjected to the drying treatment in succession.

The part of the first groove closest to the chamber is more or less completely filled by the annular element and by the first ring so that penetration inside it by granules of dried material that could contaminate a subsequently treated different material is substantially prevented.

This situation is maintained over time because the first ring constantly presses against the facing edge of the plate rotating the axial strip of the annular element, which is not subject to significant wear since it is made of a non-stick material with a low friction coefficient.

For its part, the second ring—of which the elastomeric material is advantageously isolated from direct contact with the plate for example by means of a sheath of non-stick material or an additional axial strip of the annular element—ensures that the seal is liquid-tight and that the vacuum exists in the chamber.

In an advantageous embodiment of the invention, the end wall of the casing within which the said opening is made comprises a first radially more external part and a second radially more internal part, distinct from the first part and shaped like a ring, inside which the said opening is made, the said second ring part being provided with means for selective fixing to the frame and means of movement in an axial direction.

In this way, in order to perform operations for the maintenance or replacement of sealing elements and rings, it is sufficient merely to move the ring part towards the inside of the chamber, without moving the other parts of the dryer.

This is particularly advantageous since it enables a structure to be made which completely isolates the casing from the mechanical parts, such as the supporting frame and means of rotating the shaft and plate. The casing can thus be positioned easily—in particular cantilever-mounted—in a so-called "white chamber", in which the strict purity and sterility requirements stipulated by numerous regulations are met.

Other advantages and features of the present invention will become clear from the following detailed description which is given by way of non-limiting example and with reference to the appended drawings, in which:

DETAIL DESCRIPTION OF THE INVENTION

Figure 1:
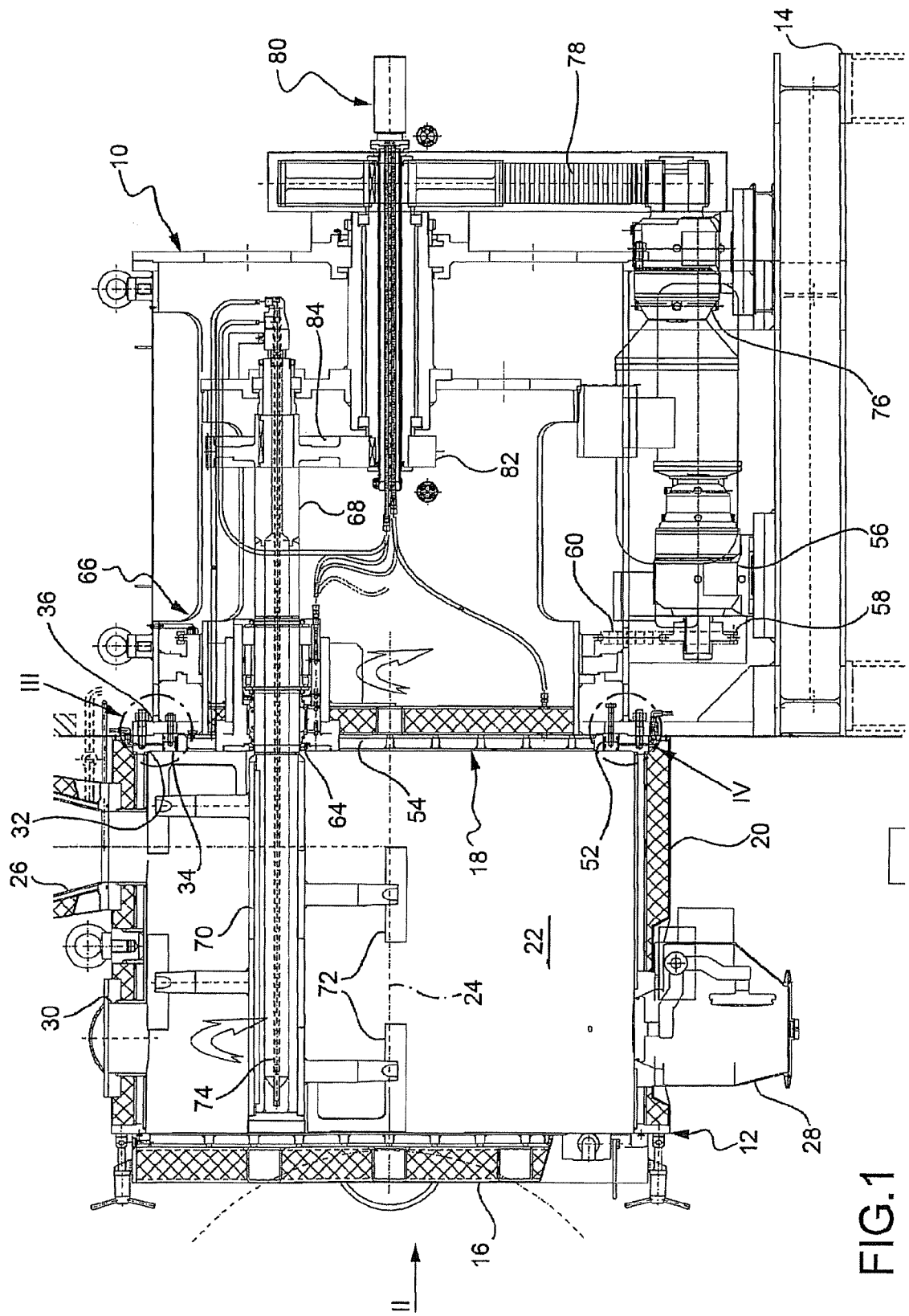
FIG. 1 is a schematic side elevation in cross-section of a dryer according to the invention.
Figure 2:
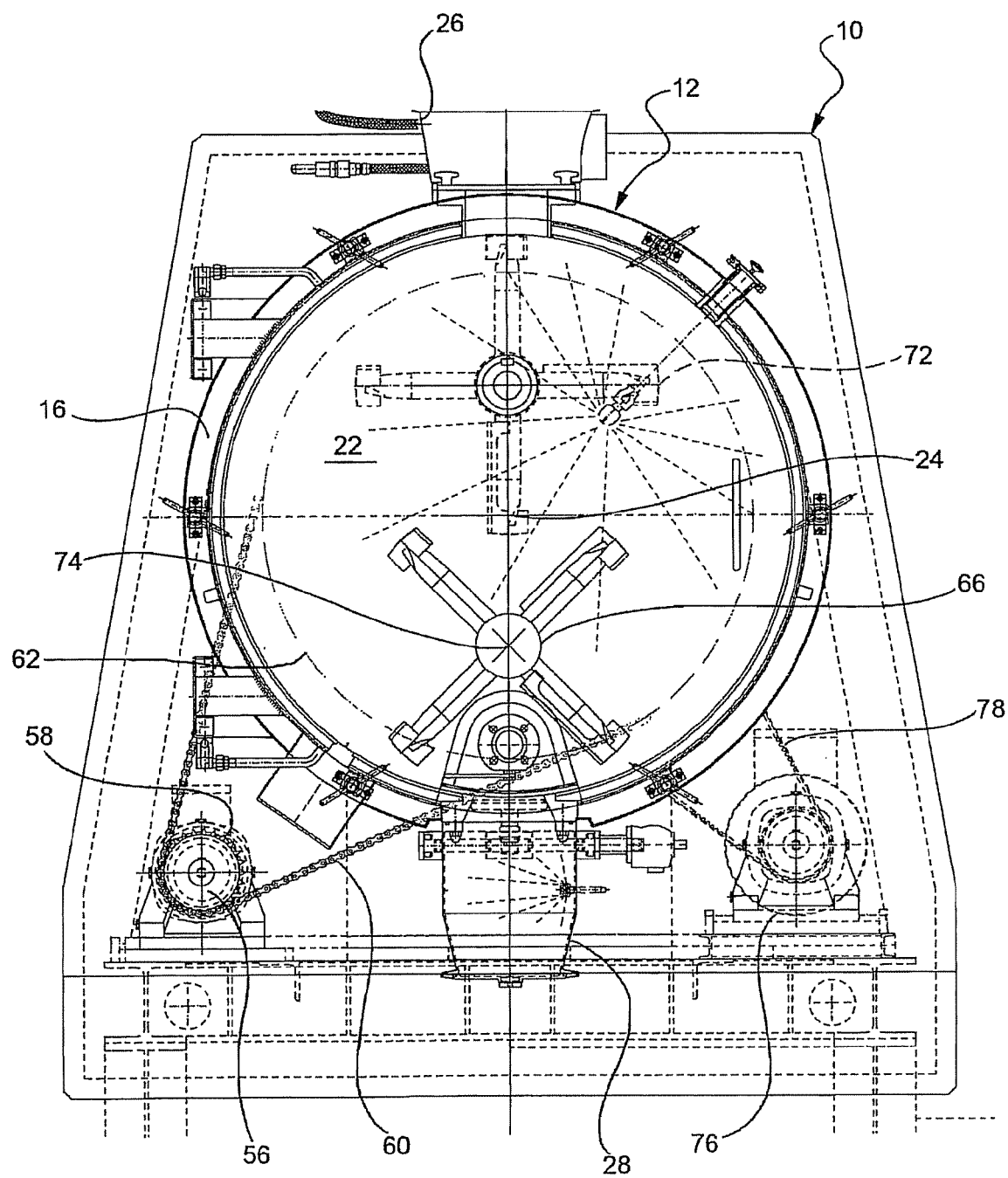
FIG. 2 is a front view of the dryer shown in FIG. 1.

A dryer, in particular for powdered or granular material, comprises (FIGS. 1 and 2) a supporting frame 10 on which a substantially cylindrical casing 12 having no direct resting points on the floor 14 is cantilever-mounted. During installation of the dryer, it is therefore possible to distinctly separate, for example by means of a wall not shown in the drawings, the respective environments, making it easier to maintain the standards of purity and sterility typically required for the environment containing the casing 12.

The latter is formed, in a per se known manner, by two opposing end walls 16, 18 and by a side wall 20, so as to define within itself a material-drying chamber 22 having a longitudinal axis 24 lying substantially horizontally. The side wall 20 is in turn formed in a conventional manner by one outer wall and one inner wall which enclose a space for the circulation of a diathermic fluid. The casing 12 is also provided with a loading hopper 26, an outlet 28 and a pipe 30 connecting to a vacuum pump to place the chamber 22 under vacuum. For the conventional details of the dryer, reference may also be made to the previously-mentioned international patent application WO-A-95/27181, the text of which is incorporated by reference in the present description.

Figure 3:
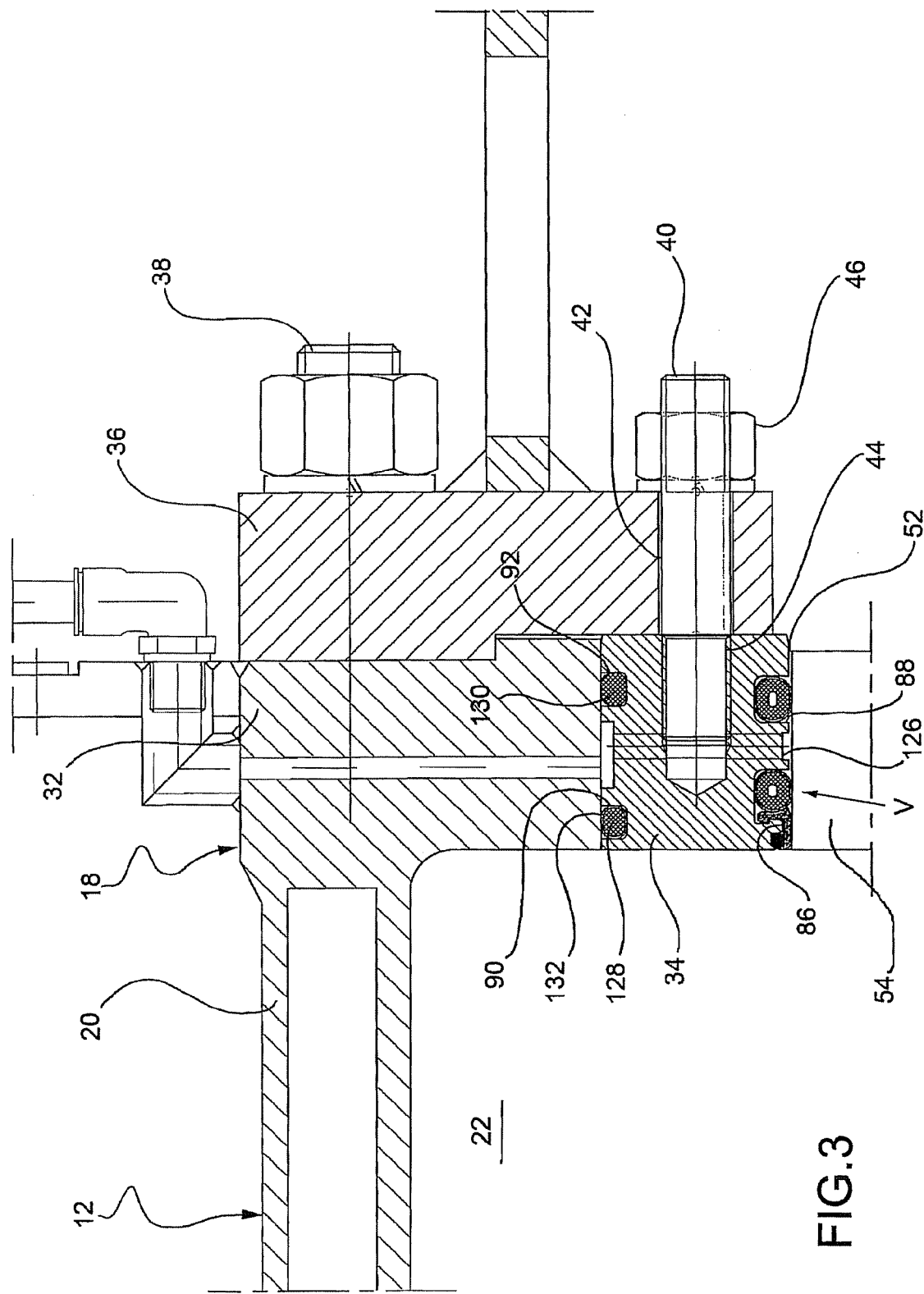
FIGS. 3 and 4 are enlarged-scale views of respective parts of FIG. 1.
Figure 4:
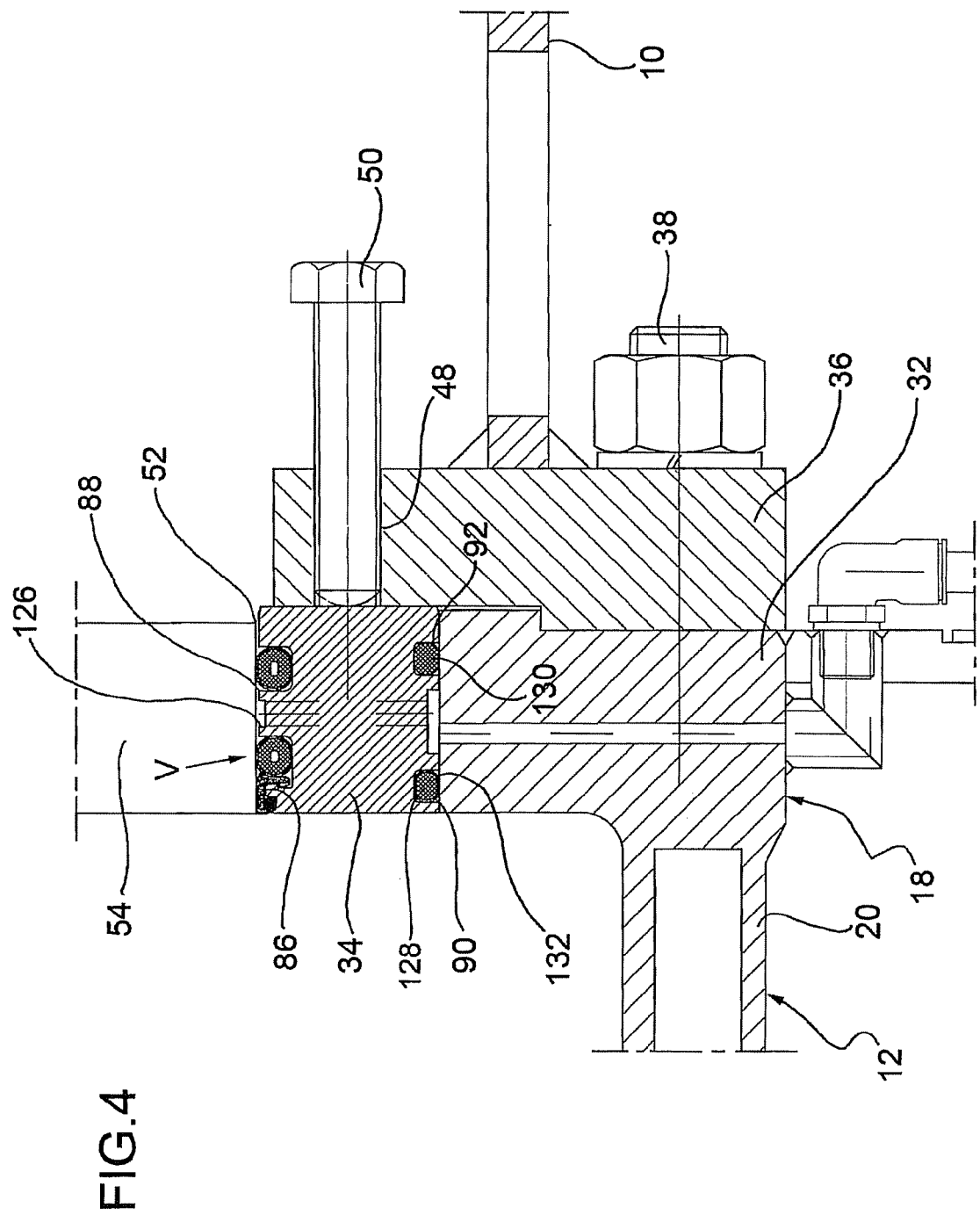

The end wall 18 of the casing 12 closest to the frame 10 comprises (FIGS. 3 and 4) a first radially more external part 32 and a second radially more internal part 34, distinct from the first part and in the shape of a ring. The two parts 32, 34 are separately fixed to a flange 36 connected to the frame 10 by means of respective pluralities of circumferentially offset screws 38, 40.

In particular (FIG. 3), the flange 36 has a first plurality of unthreaded through-holes 42 offset circumferentially and in line with a second plurality of blind threaded holes 44 made in the ring part 34. In each pair of holes formed by a blind hole 44 and the contiguous through-hole 42 a respective stud bolt 40 is inserted having one of its ends screwed into the blind hole 44 and the opposite end protruding beyond the flange for a respective nut 46 to be screwed onto it. The stud bolts 40 and the nuts 46 thus act as selective fixing means of the second ring part 34 to the frame 10.

The flange 36 also has (FIG. 4) a third plurality of threaded circumferentially-offset through-holes 48, into which respective bolts 50 can be screwed. The holes 48 are arranged around the same circumference as the holes 42 and are circumferentially offset in relation thereto. As will be explained in detail below, the distal ends of the bolts 50 can axially press against the ring part 34, once the latter has been disengaged from the frame 10.

Inside the ring part 34 a circular opening 52 is made coaxially in relation to the axis 24 of the chamber 22 and sealed by a circular plate 54, internally hollow so as to enable the circulation of a diathermic fluid.

The plate 54 (FIGS. 1 and 2) is provided with operating means to cause its rotation about the axis 24. These operating means comprise a gear motor unit 56 supported by the frame 10 and having an output shaft onto which is keyed a first toothed wheel 58 which engages by means of a chain 60 with a second toothed wheel 62 connected to the plate 54 and having its centre positioned in line with the axis 24.

The plate 54 also has a hole 64 for the sealed passage of a shaft 66 which is parallel and eccentric in relation to the axis 24. The shaft 66 comprises a first portion 68 outside the chamber 22 and a second portion 70 inside the chamber 22, from which extends a plurality of blades 72 for mixing the material to be dried inside the chamber 22 and for its detachment from the inner wall thereof.

The shaft 66 is also provided with operating means to cause it to rotate about its longitudinal axis 74. These operating means comprise an additional gear motor unit 76 having an output shaft connected by a chain 78 to an intermediate shaft 80 mounted on the frame 10 so as to be rotatable about the continuation of the axis 24 of the chamber 22. In turn, on the intermediate shaft 80 a first toothed wheel 82 is keyed which engages with a second toothed wheel 84 keyed onto the first portion 68 of the agitator shaft 66.

The ring part 34 of the end wall 18 has (FIGS. 3 and 4) on its radially inner edge, which delimits the opening 52 occupied by the plate 54, a first and a second circumferential groove 86, 88 and on its radially outer edge a third and a fourth circumferential groove 90, 92 into which are inserted respective sealing means.

Figure 5:
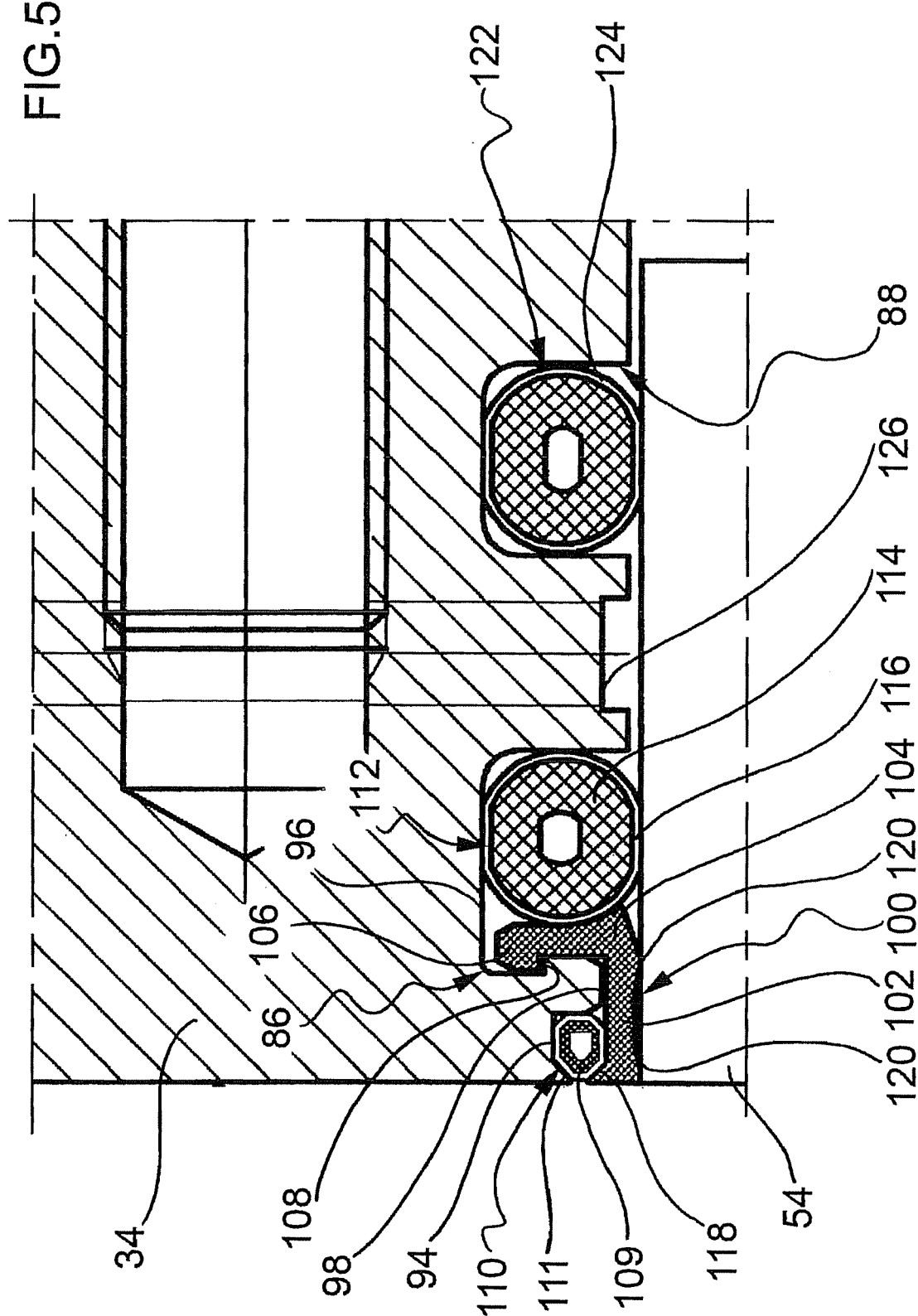
FIG. 5 is a further-enlarged-scale view of a detail of FIGS. 3 and 4.

The first groove 86, which is made in the edge portion closest to the chamber 22, is formed (FIG. 5) by a first radial cavity 94 having a mouth facing the chamber 22 and by a second radial cavity 96 deeper than the first 94, joined by an axial section 98.

An annular sealing element 100 made of a non-stick chemically inert material, such as tetrafluoroethylene for example, having an L-shaped cross-section comprising one axial strip 102 and one radial strip 104, is inserted into the first groove 86 so that the radial strip 104 is inserted into the second cavity 96 and the axial strip 102 occupies the axial section 98 and the mouth of the first radial cavity 94. Advantageously, from the distal end of the radial strip 104 extends a tooth 106 which engages in a recess 108 made in the wall of the second cavity 96.

Furthermore, a first sealing ring 110 is inserted in the first cavity 94 so as to radially compress the axial strip 102 against the plate 54. The ring 110 may have a hollow core 109 of elastomeric material covered by a sheath 111 of a substantially chemically inert material, or may be made entirely of a substantially chemically inert elastomeric material.

On the other hand, a second sealing ring 112 comprising a hollow core 114 and made of an elastomeric material covered with a sheath 116 of non-stick material such as tetrafluoroethylene is inserted into the second cavity 96 so as axially to compress the radial strip 104 against the respective wall.

The distal end of the axial strip 102 has a radially outer protrusion 118 which follows the profile of the adjacent portion of the first sealing ring 110 and a pair of radially inner protrusions 120 that constitute the points of preferential contact with the edge of the rotating plate 54. Advantageously, the first ring 110 is made of a chemically inert elastomeric material, such as a perfluoroelastomer like Kalrez®, for example, whereas the core 114 of the second ring 112 may be made of a conventional elastomer, such as Viton®, for example.

In the second groove 88 a respective additional sealing ring 122 made of an elastomeric material, covered with a sheath 124 made of a non-stick material is inserted. Between the first and the second groove 86, 88 an isolated circumferential channel 126 is thus defined which can be used for the circulation of a lubricating and cooling fluid.

In the third and fourth circumferential grooves 90, 92 too, respective sealing rings 128, 130 made of an elastomeric material are inserted, the one 128 closest to the chamber 22 being covered by a sheath 132 made of a non-stick material.

When starting the drying operation, the material to be treated fills about 70% of the chamber 22 which is placed under vacuum and the circulation of the diathermic fluid within the plate 54 and the side wall 20 of the casing 12 is activated.

Initially, the agitator shaft 66 is kept in the upper portion of the chamber 22 and is rotated only about its own axis 74, so as to reduce the stress transmitted by the material which is still very wet and sticky and in which the blades 72 are immersed only partially. As drying proceeds, the rotation of the shaft 66 about the axis 24 of the chamber 22 is also gradually activated, so as to increase mixing and detach the material sticking to the inner wall of the chamber 22.

This rotational movement also involves the rotation of the plate 54 in the opening 52 with the axial strip 102 of the annular element 100 and the sheath 116 of the second ring 112, as well as the sheath 124 of the additional ring 122 located in the second groove 88, rubbing against the plate 54. Since all these rubbing parts are made of a non-stick material with a low friction coefficient, they do not wear and ensure vacuum-tight and liquid-tight sealing over time thanks in particular to the action of the second ring 112, as well as the properties of acting as a barrier to the penetration of dust into the groove 86 thanks in particular to the action of the annular element 100 compressed by the first and second ring 110, 112.

It is very easy to maintain and replace the seals. All that is required to do this (FIG. 3), is to unscrew the nuts 46 from the stud bolts 40 thus disengaging the ring part 34 from the flange 36 and then screw (FIG. 4) the bolts 50 into the holes 48, so that the respective distal ends push the ring part 34 axially into the chamber 22, the weight of the ring part (FIG. 3) being supported by the stud bolts 40 which react against the walls of the unthreaded holes 42 made in the flange 36. The radially outer and inner edges of the ring part 34 on which the seals are housed are thus accessible from inside the chamber 22, allowing all the necessary operations to be performed. On completing such operations, the bolts 50 are screwed back into the holes 48 so as not to extend outwards, then the nuts 46 are retightened onto the stud bolts 40, so as to firmly secure the ring part 34 to the flange 36.

Figure 6:
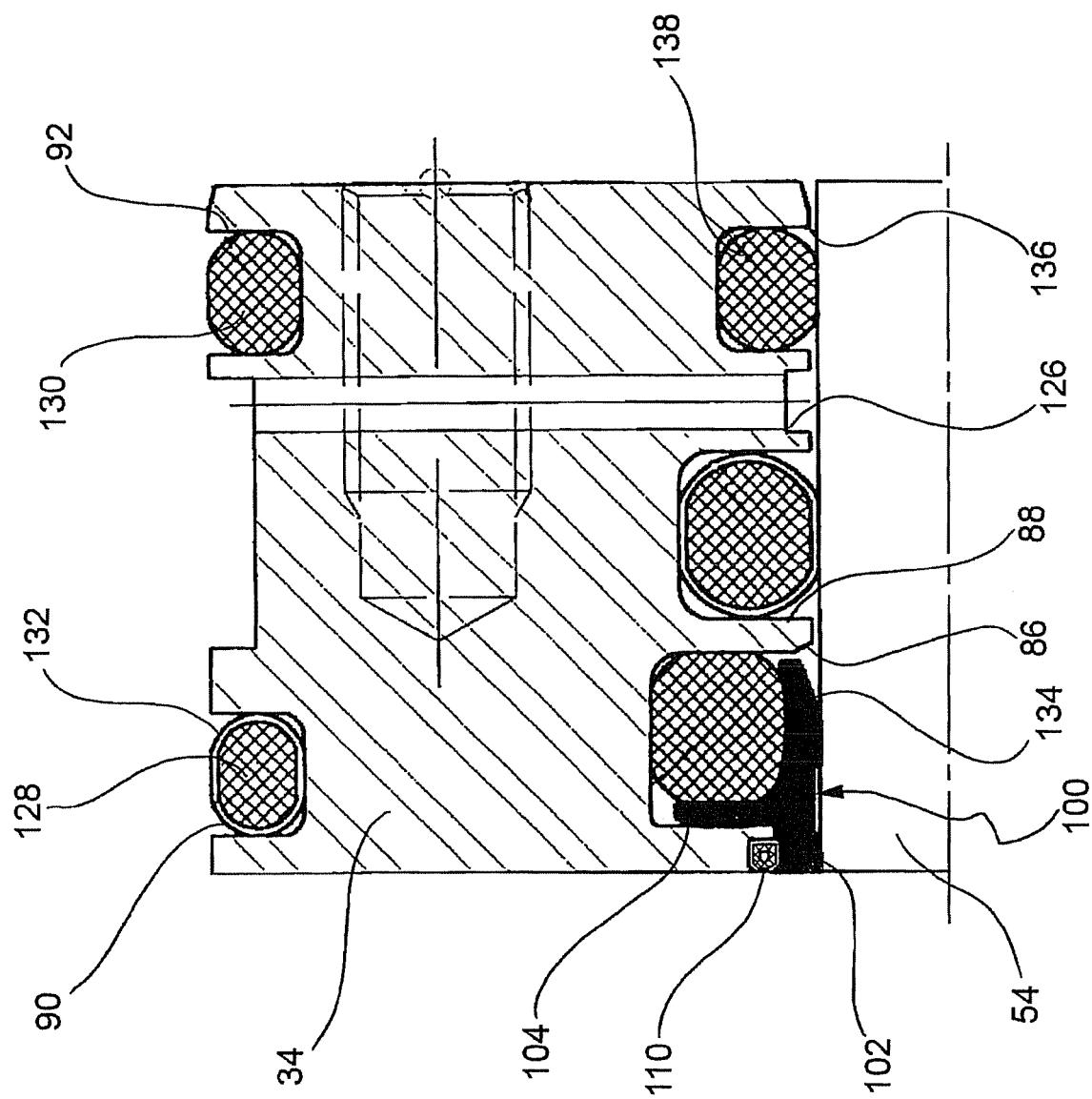
FIG. 6 is a schematic view of a variation of a part of the invention.

FIG. 6 refers to an alternative embodiment of the invention, in which like reference numerals used in the preceding drawings correspond to like or equivalent parts.

In this case, the annular element 100 of non-stick material comprises an additional axial strip 134 which constitutes an extension of the first axial strip 102 at the opposite side of the radial strip 104 so that the cross-section of the element 100 is T-shaped. The second sealing ring 112 which radially compresses the additional axial strip 134 is therefore not in rubbing contact with the rotating plate 54 and can therefore be made entirely of elastomeric material. On the radially inner edge of the ring part 34 an additional circumferential groove 136 is also made, into which a respective sealing ring 138 is inserted.

Naturally, the principle of the invention remaining the same, the forms of embodiment and parts of construction may be varied widely with respect to those described, which have been given purely by way of example, without thereby departing from the scope of the invention as defined in the appended claims.

What is claimed is:

1. A dryer for powdered or granular material comprising:
    a casing formed by two opposing end walls and one side wall, so as to define within it a chamber for drying material having a longitudinal axis;
    a shaft which is parallel and eccentric in relation to the said axis of the chamber and provided with operating means to cause it to rotate about its own longitudinal axis, the said shaft comprising a first portion outside the said chamber and a second portion arranged inside the said chamber for mixing the material to be dried;
    a circular plate that seals an opening of a complementary shape made inside one of the end walls of the casing, the said plate having a hole for the sealed passage of the said shaft and being provided with operating means to cause its rotation about the axis of the chamber also involving the said shaft in this rotational movement, and
    a frame supporting the casing and the shaft;
    wherein the edge portion of the said opening closest to the said chamber is made a first circumferential groove which is formed by a first radial cavity having a mouth and by a second radial cavity deeper than the first, joined by an axial portion, in that an annular sealing element made of a non-stick material, having a cross-section comprising at least one axial strip and one radial strip, is inserted into the said first groove in such a way that the radial strip is inserted into the said second cavity and the axial strip occupies the axial portion and the mouth of the said first radial cavity, in that a first sealing ring comprising at least one core of elastomeric material is inserted in the said first cavity so as to radially compress the said axial strip against the plate and in that a second sealing ring comprising at least one core of elastomeric material is inserted into the second cavity so as to axially compress the said radial strip.

2. A dryer according to claim 1, wherein the said annular element is made of a substantially chemically inert non-stick material including tetrafluoroethylene.

3. A dryer according to either claim 1 or claim 2, wherein the said first ring is made entirely of a substantially chemically inert elastomeric material, including a perfluoroelastomer, or has a core made of an elastomeric material covered by a sheath of a substantially chemically inert material.

4. A dryer according to either claim 1 or claim 2, wherein the core of elastomeric material of the said second ring is covered by a sheath of non-stick material.

5. A dryer according to either claim 1 or claim 2, wherein the axial strip has a radially outer protrusion which follows the profile of the adjacent portion of the first sealing ring, and a pair of radially inner protrusions.

6. A dryer according to either claim 1 or claim 2, wherein from the distal end of the said radial strip a tooth extends which engages in a recess made in the wall of the second cavity.

7. A dryer according to either claim 1 or claim 2, wherein the said annular element comprises only the said radial strip and the said axial strip so as to have an L-shaped cross-section.

8. A dryer according to either claim 1 or claim 2, wherein the said annular element comprises an additional axial strip which constitutes an extension of the first axial strip at the opposite side of the radial strip in such a way that the cross-section of the element is T-shaped and the said second sealing ring is made entirely of elastomeric material and radially compresses the said additional axial strip against the plate.

9. A dryer according to either claim 1 or claim 2, wherein on the edge of the said opening a second circumferential groove is made into which a third sealing ring comprising at least one core made of an elastomeric material is inserted.

10. A dryer according to either claim 1 or claim 2, wherein the end wall of the casing within which the said opening is made comprises a first radially more external part and a second radially more internal part, distinct from the first part and shaped like a ring, inside which the said opening is made, the said second ring part being provided with means for selective fixing to the frame.

11. A dryer according to claim 10, wherein a flange which is connected to the frame is juxtaposed to the axially external surface of the said ring part, in which flange a first plurality of unthreaded through-holes is made which are arranged offset circumferentially and in line with a second plurality of blind threaded holes made in the ring part, in each pair of holes formed by a blind hole and the contiguous through-hole a respective stud bolt is inserted having one of its ends screwed into the blind hole and the opposite end protruding beyond the flange for the screwing-on of a respective nut, the said stud bolts and the nuts acting as means for the selective fixing of the ring part to the frame.

12. A dryer according to claim 10, comprising means for moving the said ring part, once disengaged from the frame, in an axial direction.

13. A dryer according to claim 12, wherein in the said flange a third plurality of circumferentially-offset threaded through-holes are made, into which respective bolts can be screwed, the distal ends of which axially push against the said ring part, acting as means of movement.

14. A dryer according to claim 10, wherein on the radially outer edge of the said ring part a third and a fourth circumferential groove are made, into which respective sealing rings are inserted.

15. A dryer according to either claim 1 or claim 2, wherein the said casing is cantilever-mounted on the said supporting frame.

* * * * *